A. M. HARDY.
ENDLESS BELT AND OTHER LIKE ARTICLE.
APPLICATION FILED MAY 15, 1920.
1,372,428.
Patented Mar. 22, 1921.
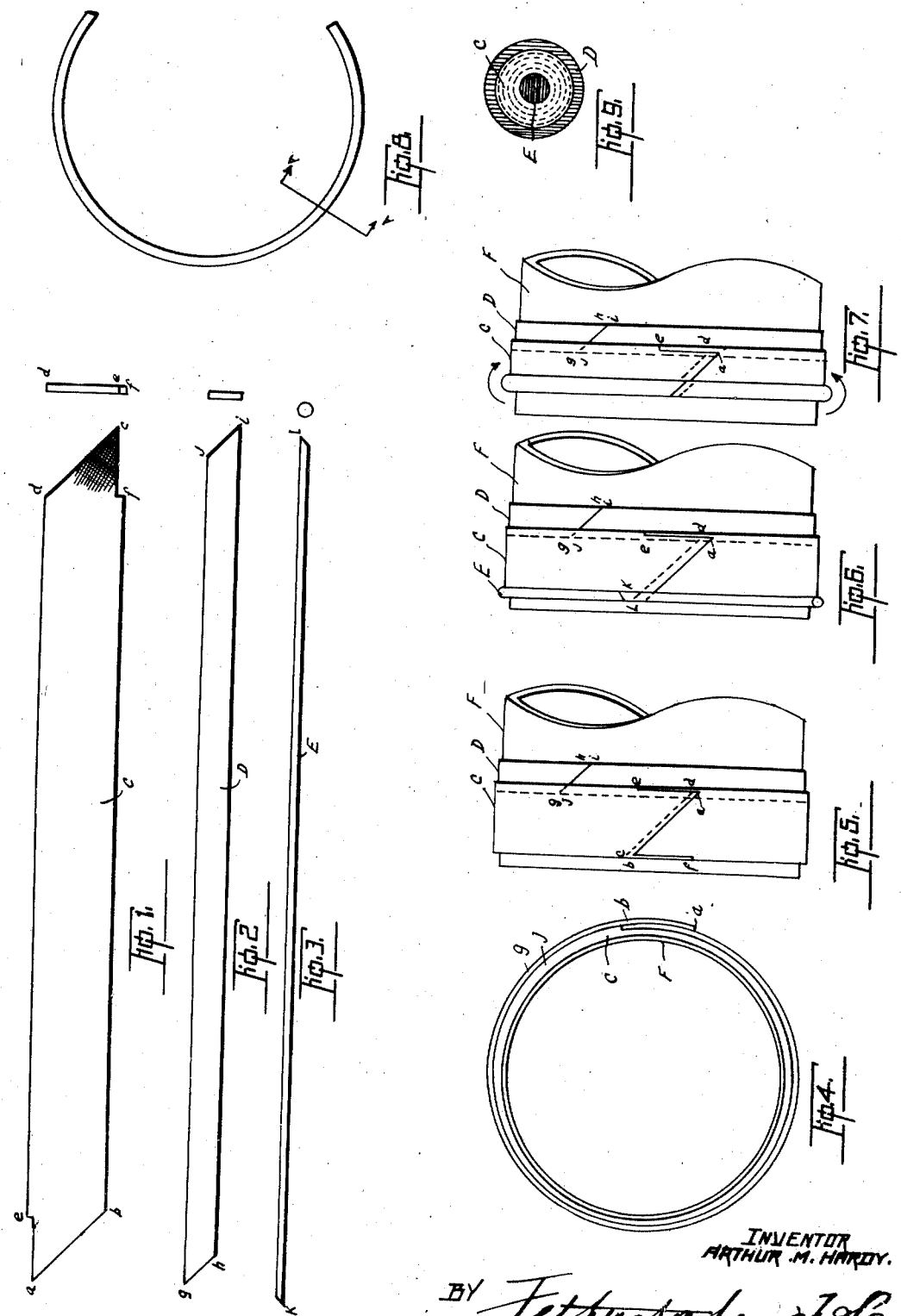
INVENTOR
ARTHUR M. HARDY.
BY Fetherstonhaugh & Co
ATTY'S.

UNITED STATES PATENT OFFICE.

ARTHUR MARK HARDY, OF BOWMANVILLE, ONTARIO, CANADA, ASSIGNOR TO THE GOODYEAR TIRE & RUBBER CO. OF CANADA, LIMITED, OF TORONTO, ONTARIO, CANADA, A CORPORATION OF CANADA.

ENDLESS BELT AND OTHER LIKE ARTICLE.

1,372,428. Specification of Letters Patent. Patented Mar. 22, 1921.

Application filed May 15, 1920. Serial No. 381,605.

*To all whom it may concern:*

Be it known that I, ARTHUR MARK HARDY, of the town of Bowmanville, in the Province of Ontario, Dominion of Canada, have invented certain new and useful Improvements in Endless Belts and other like Articles, of which the following is a specification.

My invention relates to improvements in endless belts and like articles, and is adapted for use in machine belts, automobile fan belts, motor cycle belts and generally in endless belts of round or V cross-section used in the transmission of power.

Although many forms and types of endless belts and other like articles have been and are being supplied to the public, most of these are adapted for use only on pulleys with flat driving surfaces; and none of those designed for use with pulleys having grooved or V shaped driving surfaces have been constructed so as to have a round cross-section; nor has molded rubber or rubber compound been used alone or in conjunction with composite rubber fabric to produce an endless belt or other like article for use with this type of pulley.

Therefore the principal objects of my invention are—

1. To make endless belts and other like articles of rubber and composite rubber fabric for use on grooved or wedge shaped pulleys to which the power is transmitted by the frictional contact of both sides of the belts and like articles with the pulleys, and not by a single contact on the inner side of the belts and like articles.

2. To make endless belts and other like articles of considerable strength, small weight, and great durability.

3. To make endless belts and other like articles extremely flexible, so that they can readily conform to any desired shape.

4. To give endless belts and like articles a smooth and regular surface, which will assure the maximum efficiency in power transmission.

5. To permit endless belts and other like articles to be bent, or twisted in any direction, and subjected to contrary flexion without any weakening, cracking, tearing or rupturing taking place; and, 6. Generally, to adapt endless belts and other like articles to better perform the functions required of them.

With the above and other objects in view my invention consists of a round rubber core, a composite rubber fabric and a rubber outer covering as hereinafter more particularly described in the specification and accompanying drawings.

In the drawings;

Figure 1 is a plan view of the rubber fabric used in my invention.

Fig. 2 is a plan view of the rubber cover used in my invention.

Fig. 3 is a plan view of the round rubber core used in my invention.

Fig. 4 is an end elevation of the mandrel with cover stock and fabric mounted thereon at the end of the first operation.

Fig. 5 is a plan view of the first operation.

Fig. 6 is a plan view of the second operation.

Fig. 7 is a plan view of the third operation.

Fig. 8 is a side view of the completed product manufactured in accordance with the specification.

Fig. 9 is a cross-sectional view, on line A—A in Fig. 8, of the completed product.

Similar letters refer to similar parts throughout the several views and diagrams.

Referring to the drawings;

A strip of fabric "C" which has been impregnated with rubber is cut in the shape indicated in Fig. 1, and the warp of this strip may run straight or on the bias. The length of the strip is slightly more than once the circular length of the finished article to be manufactured, and the width is such that when the finished article is completed there will be the requisite number of layers of fabric incasing the core in the manner hereinafter described. The ends of the strip are at angles of approximately 45 degrees and 135 degrees respectively with the sides; and the edges of the strip are notched or cut at *a. e.* and *f. c.*, as shown in Fig. 1, so that when the article is completed it will have a uniform thickness throughout, the over-lapping of the fabric ends creating no increase in the thickness of the finished article at that point.

A flat strip of uncured rubber "D" is cut in the shape indicated in Fig. 2. This strip is slightly longer than once the circular length of the finished article to be made; and is slightly wider than once the cross-sectional circumference of the finished article. The ends are at angles of approximately 45 degrees and 135 degrees respectively with the sides.

A round strip of uncured rubber "E" is cut as indicated in Fig. 3; with the ends at angles of approximately 45 degrees and 135 degrees respectively with the sides. The length of this strip is approximately once the circular length of the article to be made; and its diameter is as desired.

The first operation consists of laying the cover-strip "D" on a mandrel "F" of proper diameter so that the beveled ends of the strip are slightly over-lapped, one upon the other. Thus $j$ is over $g$ and $i$ is over $h$ or vice versa.

The second operation consists in placing the fabric strip "C" upon the mandrel, allowing the fabric strip to slightly over-lap the cover-strip "D." The ends of the fabric strip are so over-lapped that points $c$ and $d$ are distant from points $a$ and $b$ respectively approximately the width of the notches at $a.e.$ and $f.c.$ The cut outs or notches $a.e.$ and $f.q.$ are thus placed opposite one another. Fig. 5, illustrates the cover strip "D" and the fabric strip "C" when they have been thus placed on the mandrel.

In the third operation the core "E" Fig. 3, is placed around the mandrel "F" on top of the fabric strip "C" on the opposite side to that which over-laps the cover-strip "D." The end $k$ of the core $e$ is joined to the end $l$. This completed operation is illustrated by Fig. 6.

In the fourth operation the core "E" is given a rolling motion toward the end of the mandrel "F." This motion is indicated by Fig. 7. Owing to the natural adhesiveness of the uncured rubber the core "E" carries the fabric strip "C" with it as it is rolled over; and the fabric strip "C" rolls around the core "E," one ply over another until the cover strip "D" is reached. This, in turn adheres to the fabric strip "C" and is carried around the outside of the core and fabric completely incasing them.

The article being manufactured is then removed from the mandrel; and after being placed in a mold of suitable type and dimensions, the uncured rubber employed in its construction is vulcanized. This is the final step in the process of manufacture.

Fig. 8 is a side view of the completed article; and Fig. 9, a cross-section of the completed article at line A—A in Fig. 8, shows the core "E" in the middle with the several layers or plies of fabric "C" superimposed upon it, and the cover-strip "D" on the outside incasing all.

While the belts and other like articles have been described herein as being manufactured of rubber and composite rubber fabric, it is to be understood that other similar resilient materials such as rubber compounds or rubber substitutes might be used in place of rubber.

As many changes could be made in the construction above outlined, such as varying the cross-sectional shape of the rubber core "E" or the width of the cover strip "D" or the method of joining the ends of fabric strip "C," within the scope of my claims without departing from the spirit or scope thereof, it is intended that all matters contained in the above specification and accompanying drawings shall be interpreted as illustrating the principles and methods employed in my invention, and not as limiting the scope of the claims to the methods and dimensions particularly set out.

I am aware that prior to my invention, endless belts and other like articles have been manufactured of various fabrics impregnated with rubber or other similar resilient substances, and of various other materials. Therefore, I do not claim such an invention broadly, but what I do claim as my invention and desire to secure by Letters Patent is as follows:

1. A new article of manufacture, an endless belt comprising an endless rubber core, a strip of rubber impregnated fabric having diagonally cut and overlapping ends and being rolled around the core, and a rubber outer cover.

2. The herein described method of manufacturing an endless belt, which consists in first making an endless rubber core, then rolling a rubber impregnated fabric laterally around the core, and around itself, then rolling a cover strip of rubber around the fabric, as herein set forth and described.

3. The herein described method of manufacturing an endless belt, which consists in first placing a rubber covering strip, a strip of rubber impregnated material, and a rubber core, side by side on a suitable appliance, then rolling the core over the rubber impregnated fabric, then incasing the core by winding the fabric around it, then rolling the core and fabric over the rubber covering whereby the core and fabric are inclosed by the covering.

4. The herein described method of manufacturing an endless belt, which consists in first making an endless strip of rubber impregnated fabric, having diagonally cut overlapped ends, secured together, then rolling a rubber core in the fabric, then rolling the fabric and core in a rubber covering member.

5. An endless belt having a reinforcing fabric member formed with overlapping ends having notched sides adapted to prevent an increase in the thickness of the finished article at the point where the fabric ends are joined.

In witness whereof I have hereunto set my hand in the presence of two witnesses.

ARTHUR MARK HARDY.

Witnesses:
    GERTRUDE CONWORTH,
    HARRY N. BARRY.